United States Patent

Matsumoto

[15] 3,656,767
[45] Apr. 18, 1972

[54] SPACER EXPANDER
[72] Inventor: Yoshio Matsumoto, Gumma, Japan
[73] Assignee: Nippon Piston Ring Co., Ltd., Tokyo, Japan
[22] Filed: Mar. 16, 1970
[21] Appl. No.: 19,828

[30] Foreign Application Priority Data

Sept. 6, 1969 Japan....................................44/84628

[52] U.S. Cl............................................277/140, 277/202
[51] Int. Cl..........................................F16j 9/06, F16j 15/00
[58] Field of Search..........................277/139, 140, 141, 202

[56] References Cited

UNITED STATES PATENTS

| 3,172,672 | 3/1965 | Marien | 277/140 |
| 3,381,971 | 5/1968 | Mayhew | 277/140 |

Primary Examiner—Samuel B. Rothberg
Attorney—Sughrue, Rothwell, Mion, Zinn & Macpeak

[57] ABSTRACT

A spacer expander for an internal combustion engine piston ring assembly has a plurality of T-shaped cut-out portions alternating from both side edges so that remaining edge portion forms a plurality of projections between the cut-out portions. Upper pressure areas, vertical outside areas and lower pressure areas, with a plurality of oil passages formed on the outside areas, are formed between the cut-out portions. The projections are curved outwardly at right angles. The upper and lower pressure areas are curved with respect to the vertical outside areas and at right angle to the same sides. The spacer expander is inserted into the piston groove by bending it into circular shape so that the projection side lies to the inside of the groove in such a manner that side rails inserted into the piston groove are mounted on the spacer expander at their projections so that the projections push the side rails in the outward direction in order for the outer peripheral surface of the side rails to slidably contact with the cylinder wall.

2 Claims, 3 Drawing Figures

PATENTED APR 18 1972 3,656,767

INVENTOR
YOSHIO MATSUMOTO

BY *Sughrue, Rothwell, Mion, Zinn & Macpeak*

ATTORNEYS.

SPACER EXPANDER

BACKGROUND OF THE INVENTION

Field of the Invention

This invention relates to a spacer expander for an internal combustion engine piston ring assembly, and more particularly to an improved simple spacer expander adapted to provide high resiliency so as to maintain the contact pressure of the side rails with the cylinder wall constant to increase the conformability of the same.

SUMMARY OF THE INVENTION

The present invention provides a spacer expander for an internal combustion engine which is both simple and strong in structure. The present invention provides a spacer expander having increased flexibility to increase the conformability of the side rails with the piston groove to the cylinder wall.

The spacer expander allows high fluidity of oil due to the provision of oil passages at the vertical outside area thereof.

In particular, the present invention provides a spacer expander which is adapted for use in a piston having a groove for the piston ring of narrow width in the axial direction of the groove.

The other features and advantages of the present invention will become apparent from the following description taken in conjunction with the accompanying drawings:

DESCRIPTION OF THE PREFERRED EMBODIMENT

Figure 1:
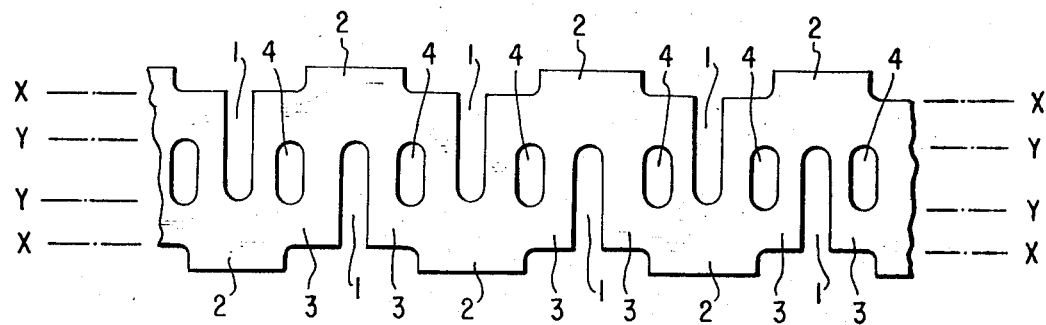
FIG. 1 is a plan view of the original strip material forming the spacer expander of the present invention.
Figure 2:
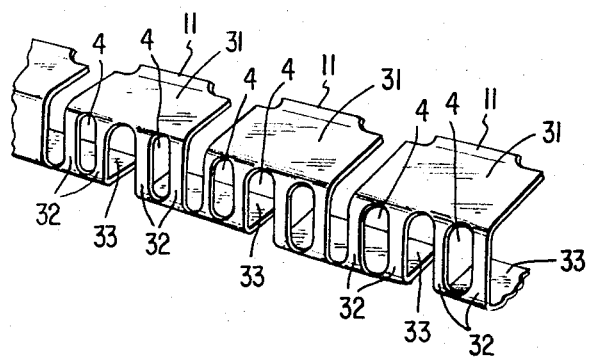
FIG. 2 is a perspective view of the spacer expander after forming in accordance with the present invention.
Figure 3:
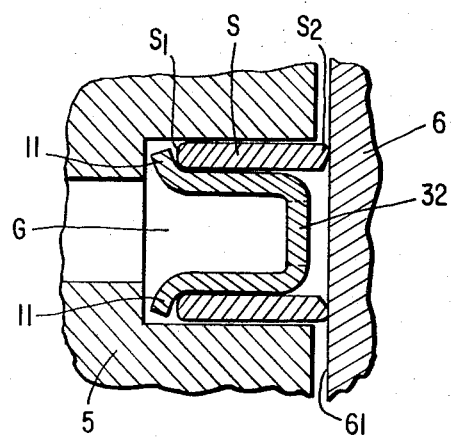
FIG. 3 is a partial sectional view of a portion of the engine showing the spacer expander inserted into the groove of the piston in combination with side rails.

Reference is now made to the drawing, and in particular to FIG. 1, which shows an original flat plate for the spacer expander before forming. The spacer expander for an internal combustion engine comprises a plurality of cut-out portions 1, of T-shape configuration equidistantly formed, in alternate fashion on both sides, so that the remaining portions 3 form a plurality of projections 2, on both sides and between the cut-out portions 1. Upper pressure areas 31, vertical outside areas 32, lower pressure areas 33 are formed, and a plurality of oil passages 4 are formed within the outside areas 32, formed between the cut-out portions 1. The projections 2 of the spacer expander are bent outwardly at the line X at right angles at both sides as shown in FIG. 1. The upper and lower pressure areas 31 and 33 are bent with respect to the vertical outside areas 32 at right angles toward the same sides, at lines Y at both sides as shown in FIG. 1. Thus formed, original plate of the spacer expander is cut to a desired length thereof and bent into circular shape such that the projection side is to the inside. Thereafter, this spacer expander as thus bent is inserted into the groove G of the piston 5 for the piston ring in such a manner that the side rails S also inserted into the groove of the piston, are mounted on the spacer expander at the projections 11 on both sides so as to push the side rails at the inner peripheral edges $S_1$ in an outward direction in order for the outer peripheral edges $S_2$ of the side rails S to slidably contact the cylinder wall 61 of cylinder 6.

In operation of thus constructed spacer expander, when the piston moves within the cylinder, since the lubricant oil passes through the oil passages 4 and the resilient spacer expander pushes the side rails from the inner peripheral edges $S_1$ outwardly and accordingly the outer peripheral edges $S_2$ of the side rails are forced into smooth contact with the inner wall of the cylinder, the side rails readily follow the movement of the piston within the cylinder.

It is understood from the foregoing description that the spacer expander defined by a plurality of T-shape cut-out portions of the present invention is simple and not only strong structurally but is also flexible to increase the conformability of the side rails when inserted into the piston groove to the cylinder wall.

It is also understood that the present invention provides a spacer expander which maintains good fluidity of the oil by the provision of the oil passages at the vertical outside area and is readily adapted for use with a piston having a groove of narrow width in the axial direction of the piston.

What is claimed is:

1. A spacer expander for an internal combustion engine piston ring assembly comprising:

a thin strip having a plurality of equidistantly spaced T-shaped cut-out portions alternating from both sides thereof, and forming a plurality of projections at both sides between said cut-out portions, said strip being bent between said cut-out portions into substantially a U-shaped cross-sectional configuration to further define upper pressure areas, vertical outside areas and lower pressure areas, with said projections being bent outwardly at right angles from said upper and lower pressure areas and said upper and lower pressure areas bent at right angles with respect to said vertical outside areas and toward the same side thereof, said upper and lower pressure areas each comprising a series of continuous segmented portions, and a plurality of oil passages within said outside areas between each said cut-out portion lying in the same vertical plane.

2. A piston ring assembly for a piston reciprocating within a cylinder and having a peripheral groove facing the cylinder wall, said assembly comprising:

a spacer in the form of a thin strip having a plurality of equidistantly spaced T-shaped cut-out portions alternating from both sides thereof, and forming a plurality of projections at both sides between said cut-out portions, said strip being bent to further define upper pressure areas, vertical outside areas and lower pressure areas, with said projections being bent outwardly at right angles from said upper and lower pressure areas and said upper and lower pressure areas bent at right angles with respect to said vertical outside areas and toward the same side thereof, said upper and lower pressure areas each comprising a series of continuous segmented portions, and a plurality of oil passages formed within said outside areas between each said cut-out portion lying in the same vertical plane, said spacer expander being inserted into said piston groove by bending it into circular shape with said projections toward the bottom of said groove, and said side rails inserted within the piston groove and mounted on said spacer expander with said projections contacting the inner peripheral surface of respective side rails to push the side rails outwardly so that the outer peripheral surface of said side rails slidably contact the cylinder wall of the internal combustion engine.

* * * * *